United States Patent
Manesh

(10) Patent No.: US 10,377,670 B2
(45) Date of Patent: Aug. 13, 2019

(54) GYPSUM CEMENT COMPOSITION AND ARTICLES FORMED THEREOF

(71) Applicant: Alireza Molaei Manesh, Richmond Hill (CA)

(72) Inventor: Alireza Molaei Manesh, Richmond Hill (CA)

( * ) Notice: Subject to any disclaimer, the term of this patent is extended or adjusted under 35 U.S.C. 154(b) by 191 days.

(21) Appl. No.: 15/582,857

(22) Filed: May 1, 2017

(65) Prior Publication Data

US 2017/0320780 A1 Nov. 9, 2017

Related U.S. Application Data

(60) Provisional application No. 62/331,535, filed on May 4, 2016.

(51) Int. Cl.

| | |
|---|---|
| *C04B 28/14* | (2006.01) |
| *B28B 1/52* | (2006.01) |
| *C04B 14/04* | (2006.01) |
| *C04B 14/42* | (2006.01) |
| *C04B 18/24* | (2006.01) |
| *C04B 24/26* | (2006.01) |
| *B28B 17/02* | (2006.01) |
| *C04B 103/22* | (2006.01) |

(52) U.S. Cl.
CPC .............. *C04B 28/147* (2013.01); *B28B 1/52* (2013.01); *B28B 1/522* (2013.01); *B28B 17/023* (2013.01); *C04B 14/045* (2013.01); *C04B 14/42* (2013.01); *C04B 18/248* (2013.01); *C04B 24/2641* (2013.01); *C04B 28/14* (2013.01); *C04B 28/146* (2013.01); *C04B 28/145* (2013.01); *C04B 28/148* (2013.01); *C04B 2103/22* (2013.01); *Y02W 30/97* (2015.05)

(58) Field of Classification Search
CPC ... C04B 28/145; C04B 28/146; C04B 28/147; C04B 28/14; C04B 18/246; C04B 28/148
USPC ........................................................ 264/256
See application file for complete search history.

(56) References Cited

U.S. PATENT DOCUMENTS

| | | | | |
|---|---|---|---|---|
| 6,197,107 | B1 * | 3/2001 | Stav | ........................ C04B 28/04 106/718 |
| 8,038,790 | B1 * | 10/2011 | Dubey | .................... B28B 1/522 106/675 |
| 2009/0235600 | A1 * | 9/2009 | Logan | .................. B28B 7/0073 52/314 |

* cited by examiner

*Primary Examiner* — Joseph S Del Sole
*Assistant Examiner* — Lawrence D. Hohenbrink, Jr.
(74) *Attorney, Agent, or Firm* — Teitelbaum Bouevitch & McLachlen; Neil Teitelbaum

(57) ABSTRACT

A composition for forming molded mantels, columns and other decorative enhancement to fireplace openings is formed of a mixture of alpha hemihydrate gypsum plaster, cement, filler and milled fiber. By using this composition with water and acrylic binder a mixture is formed which sets and gains strength quickly and is an ideal material for manufacturing architectural and decorative structures. Advantageously, a casted piece can be removed from a mold within two to three hours after casting. The finished product has a desired finish that is similar to a casted gypsum cement, referred to sometimes as a honed finish which can withstand high heat, discoloration and cracking while maintaining suitable strength when exposed to typical temperatures of a fireplace surround in indoor applications.

23 Claims, No Drawings

GYPSUM CEMENT COMPOSITION AND ARTICLES FORMED THEREOF

CROSS REFERENCE TO RELATED APPLICATIONS

The present invention claims priority from U.S. Patent Application No. 62/331,535 filed May 4, 2016, which is incorporated herein by reference.

BACKGROUND OF THE INVENTION

Plaster moulded mantels, and columns provide a decorative enhancement to a fireplace opening. They are often formed from a mixture of gypsum plaster, for example beta hemihydrate, and gypsum cement such as alpha hemihydrate, which is approximately 4 times stronger than beta hemihydrate. Because gypsum forms easily, sets and gains strength quickly, it is an ideal material for manufacturing architectural and decorative structures. Advantageously, a casted piece can be removed from a mould within two to three hours after casting. Thus, it is a very accepted and used material, which can save time, space, and allow a mould to be reused shortly after pouring which is important in the overall process of mould formation.

Notwithstanding, there is a disadvantage to the aforementioned mixture. It is not ideal when used in high-heat applications, for example, when used as a fireplace surround in situ. Calcination of the material can occur in the presence of high heat, and the cast structure can lose the strength, crack and/or discolour.

It is an object of this invention to provide a composition with similar workability as the standard available gypsum cement commercial mixture and create a desired finish that is similar to a casted gypsum cement, referred to sometimes as a honed finish which is highly desirable, which can withstand high heat, discoloration and cracking while maintaining suitable strength when exposed to typical temperatures of a fireplace surround in indoor applications.

Commercially available glass fibre reinforced cement (GFRC) is sometimes used for this purpose, however it is not ideal. GFRCs are made from cement 20-30%+sand 70-80%+Glass fibre 3-5% (all by weight). Although GRFC withstands heat, it is not a preferred material because of its poor product-ability, pieces need minimum 24 hours to de-mould, its poor workability; it takes about 36 hours to be polish-able after casting, and it does not provide a desired honed look or feel.

To be a commercially viable and desirable product, texture is very important and when plain gypsum cement is sanded and polished, it becomes too smooth, shiny and marble like instead of having a duller honed look and feel. Therefore GFRC is not considered a preferred material.

SUMMARY OF THE INVENTION

This disclosure provides a composition, mixture and structure made from said mixture that provides a similar surface, texture, and finish to plain gypsum cement while being able to withstand cracking while fully or substantially maintaining its color over time and maintaining structural integrity. The cost of the mixture is also less than the cost of most commercially available products used today that provide this look and feel and structural integrity when used in high heat applications.

In accordance with the invention there is provided, a gypsum cement composition, comprising: gypsum plaster; cement; micronized filler; and, milled fibre.

In accordance with this invention, a composition, by percent weight is provided comprising:
 Alpha or Beta hemihydrate (gypsum plaster): 7-36%
 Calcium aluminate cement or Portland cement: 20-50%
 Filler in powder form mesh from 120 and up: 20-50%
 Milled glass or cotton fibre size ⅛" (Range: ¹⁄₃₂"-½"): 1-6%
 Tartaric Acid or other set retarders: 0-0.5%

The term "up" when used to describe mesh size compared to 120 implies a smaller powder. For example 130 mesh. The phrase "at least 80 mesh" used hereafter is to mean 80 mesh or up, for example 90 mesh.

This composition is mixed with pure water or water and acrylic binder. The addition of acrylic binder is suggested. The water to powder ratio is: one part water or water and acrylic binder with 3.45 to 6 parts of the composition by weight for preferred results.

Preferably, approximately 30%+/−6% gypsum plaster, approximately 33%+/−5% Calcium aluminate cement or Portland cement, is used, approximately 33.5%+/−5% filler in powder form having a mesh size of 140 or more is used, 3.5%+/−2% milled glass or cotton fibre is used.

More preferably approximately 30% gypsum plaster, approximately 33% Calcium aluminate cement or Portland cement, is used, approximately 33.5% filler in powder form having a mesh size of 140 or more is used, 3.5% milled glass or cotton fibre is used.

In a broad aspect of the invention, a composition is provided comprising:
 a) Gypsum hemihydrate (alpha or beta)
 b) Cement
 c) Fine micronized filler (Mesh 120 or up); and,
 d) Milled fibre.

In another aspect of this invention, a moulded article is provided formed of:
 a) Gypsum hemihydrate (alpha or beta)
 b) Cement
 c) Fine micronized filler (Mesh 120 or up); and,
 d) Milled fibre.

In yet another aspect of the invention, there is provided a method of forming an object comprising:
 providing a slurry of gypsum plaster 20% to 45%; cement; micronized filler; and, milled fibre into a mould to form a first layer, and after the first layer sets, applying a second backup layer over the set first layer.

In another aspect of the invention, there is provided a gypsum cement composition, comprising:
 gypsum plaster 10%-45% by weight;
 cement;
 micronized filler of at least 80 mesh; and,
 milled fibre, wherein the total amount of cement and filler combined is at least 50% by weight and less than or equal to 90% by weight, and wherein the amount of cement is at least 10% or more by weight, and wherein the amount of filler is less than or equal to 85% by weight.

In yet another aspect of the invention, there is an object formed of a composition of alpha or beta hemihydrate gypsum plaster about 20%-40% by weight; the cement is calcium aluminate cement or Portland cement 20-50% by weight; the filler is in powder form having a mesh size from about 120 or up and about 20-50% by weight, and milled fibre 1%-6% by weight.

DETAILED DESCRIPTION

A composition described hereafter can be used to mould articles and these moulded articles, such as fireplace mantles can withstand heat of at least 400 degree Fahrenheit.

It should be understood that using different fillers can generate different attribution. The particular form of glass fibre, which can be in numerous forms, can affect the finished surface.

This composition is recommended for indoor use only.

Milled fibre is preferable to regular chopped fibre. Chopped fibre, which can be seen at the surface is deleterious to the appearance of the finished product. I have discovered that it takes less effort to mix the composition when milled fibres are used compared to chopped fibre, as the milled fibres are already substantially separated.

Glass fibers are preferred because there is a strong chemical bond between glass fibre and cement. In situations where glass is not desired, cotton fibre is a suitable choice.

The cross sectional diameter of a single strand of milled fibre is 5 to 13 microns, which are very difficult if not impossible to see, while the cross sectional diameter of a regular chopped fibre when it is not separated, can be up to 2 mm. Therefore, milled fibres are preferred.

Three aspects specific to this invention comprise:

a) The use of micronized filler, preferably nepheline syenite instead of rough sand. This fine nepheline syenite assists in providing a very smooth finish similar to pure alpha gypsum plaster. Nepheline syenite is also relatively safe if inhaled compared to other fillers.

b) The use of milled fibre instead of chopped fibre so as to substantially invisibly reinforce while preventing cracking.

c) Adding gypsum in the cement base slurry to set fast and let de-moulding the piece in a very short cycle.

It is preferred that no sand is added to the mixture of this invention, as it is deleterious to the finish.

Using more than about 40% by weight of gypsum can result in discoloration in the presence of heat at high temperatures. If the gypsum is less than about 20% by weight, de-moulding and polish-ability will be poor; the more gypsum, the more product-ability and early strength. I have discovered that alpha gypsum yields a much better result than beta gypsum. I have also found that the best finish comes from the fine nepheline syenite filler. It is the synergistic combination of these elements that provides a product having a preferred look, feel and strength and longevity not found elsewhere. Thus it is preferred to have the percent by weight of gypsum no more than about 38% and no less than about 25%.

Of course pigment can be added to the mixture, for example iron oxide to change the color, however the mixture with pigment added will itself not change color in the presence of heat when used, for example as a fireplace surroundings.

There are several advantages using the mixture of this invention. After casting, there is little to no expansion or shrinkage, wherein alpha and beta gypsum plaster expands after setting and GFRC or other cement base casts generally shrink. Using about 30% gypsum, and not significantly more, appears to prevent expansion, and using not significantly less than 30% gypsum appears to prevent shrinkage.

Another advantage of this invention is that it allows packing to be done in two steps. Typically, when using alpha gypsum plaster, a first slurry with pigment is mixed and is packed into the mould and this is called the face. Because a hollow product is made and the slurry is not poured, it is packed using a dough-like thick slurry. Immediately after the first face layer sets, usually within 15-20 minutes, a second layer called backup layer is applied. A mesh and other supporting material is placed in or on the second layer; this second layer is comprised of the same material without pigment added. This cannot be done using GFRC easily, or at all, as the first layer is not strong enough in the same day to do the backup layer. Therefore in the instant composition of this invention allows packing the same way as with alpha gypsum. I have also found, that because super plasticizer is not used for required in the mix, the workability is improved.

Adding milled fibre in the mixture improves the bending strength and allows thinner and lighter products to be made. Advantageously, use of the fine filler prevents or lessens efflorescence. And yet another advantage of this invention is that most cement base concrete, including GFRC, will face hairline cracks several months after casting even without heating, but the composition of the instant invention is substantially crack resistant.

Numerous other embodiments may be envisaged without departing from the spirit and scope of the invention.

What is claimed is:

1. A gypsum cement composition, comprising:
   gypsum 10%-45% by weight;
   cement;
   micronized filler of at least 80 mesh; and,
   milled fibre, wherein the total amount of cement and filler combined is at least 50% by weight and less than or equal to 90% by weight, and wherein the amount of cement is at least 10% or more by weight, and wherein the amount of filler is less than or equal to 85% by weight.

2. A gypsum cement composition as defined in claim 1, mixed with water.

3. A gypsum cement composition as defined in claim 1, wherein the gypsum is alpha or beta hemihydrate.

4. A gypsum cement composition as defined in claim 3, wherein the milled fibre is milled cotton or milled glass fibres.

5. A gypsum cement composition as defined in claim 3, wherein the gypsum is alpha or beta hemihydrate and is about 25-38% by weight.

6. A gypsum cement composition as defined in claim 5, wherein the cement is about 20-50% by weight.

7. A gypsum cement composition as defined in claim 6, wherein the cement is calcium aluminate cement or Portland cement and is 25-40% by weight.

8. A gypsum cement composition as defined in claim 7, wherein the micronized filler in powder form has a mesh size greater or equal to about 120, and about 20-50% by weight.

9. A gypsum cement composition as defined in claim 7, wherein the milled glass or cotton fibres are of a length of about ⅟32"-½".

10. A gypsum cement composition as defined in claim 4, wherein the milled glass or cotton fibres are 1-6% by weight and wherein the composition excludes sand.

11. A gypsum cement composition as defined in claim 7, further comprising a set retarder.

12. A gypsum cement composition as defined in claim 7 wherein the gypsum is 30%+/−6% by weight.

13. A gypsum cement composition as defined in claim 7, wherein the calcium aluminate cement or Portland cement is about 33.5%+/−5% by weight.

14. The gypsum cement composition as defined in claim 1, mixed with water or water and acrylic binder, wherein the water or acrylic binder to powder ratio is: one part water or water and acrylic binder with 3.45 to 6 parts of the composition by weight for preferred results.

15. The gypsum cement composition as defined in claim 12, wherein the micronized filler in powder form has a mesh size of 140 or more and wherein the milled fibre is glass or cotton fibre is 3.5%+/−2% by weight.

16. The gypsum cement composition as defined in claim 13, wherein the micronized filler in powder form has a mesh size of 140 or more and wherein the milled fibre is glass or cotton fibre is 3.5%+/−2.5% by weight, and wherein the composition is mixed with water or water and acrylic binder, wherein the water or acrylic binder to powder ratio is: one part water or water and acrylic binder with 3.45 to 6 parts of the composition by weight for preferred results.

17. The gypsum cement composition as defined in claim 16, wherein the filler is nepheline syenite.

18. The gypsum cement composition as defined in claim 13, in the absence of sand.

19. A gypsum cement composition as defined in claim 1, mixed with an acrylic binder.

20. A method of forming an object comprising:
providing a slurry of gypsum 20% to 45%; cement; micronized filler; and, milled fibre into a mould to form a first layer, and after the first layer sets, applying a second layer over the set first layer.

21. The method as defined in claim 20, wherein the slurry is packed and wherein the
gypsum is alpha or beta hemihydrate about 20-38% by weight,
the cement is calcium aluminate cement or Portland cement about 20-50% by weight,
the milled fibre is of a length of about 1/32"-1/2" and is about 1-6% by weight, and wherein the filler has a mesh size of 120 or more.

22. An object formed of the composition defined in claim 1, wherein the gypsum is alpha or beta hemihydrate about 25-38% by weight;
the cement is calcium aluminate cement or Portland cement 20-50% by weight; the filler is in powder form having a mesh size from about 120 or greater and about 20-50% by weight, and wherein the milled fibre is milled glass or cotton having a fibre length of about 1/32"-1/2" and is about 1-6% by weight.

23. An object as defined in claim 22, wherein the composition is absent sand.

* * * * *